Dec. 10, 1929. V. J. KUBIN ET AL Re. 17,522

ROTARY DISK BIT

Original Filed July 7, 1925

Inventors
Van J. Kubin and
Perry Funderburk
by W. H. Ulldewell
their Attorney

Reissued Dec. 10, 1929

Re. 17,522

UNITED STATES PATENT OFFICE

VAN J. KUBIN, OF TORRANCE, AND PERRY FUNDERBURK, OF HUNTINGTON BEACH, CALIFORNIA

ROTARY DISK BIT

Original No. 1,599,094, dated September 7, 1926, Serial No. 42,042, filed July 7, 1925. Application for reissue filed September 17, 1927. Serial No. 220,199.

This invention relates to a rotary drill bit particularly useful for drilling oil wells and the general object of the invention is to provide a bit of high cutting efficiency.

A more particular object of the invention is to provide a drill bit of the character stated with three or more cutters spaced and set so as to effectively center the bit at all times.

A further object of the invention is to provide a rotary drill bit with double edge cutters arranged so that one edge of each cutter acts on or cuts the bottom of the hole while the other edge cuts or reams the side of the hole.

Other objects, features and advantages of the present invention will appear hereinafter and from consideration of the drawings.

Figure 1:
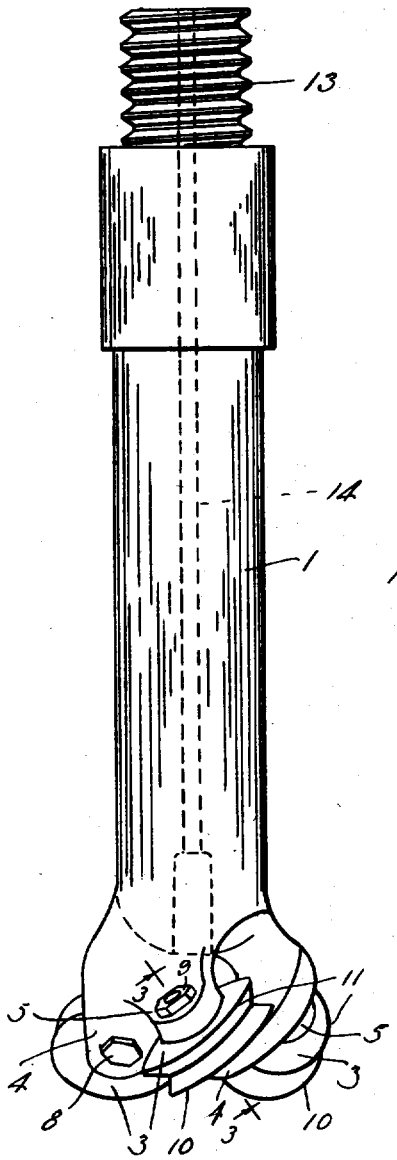
Figure 3:
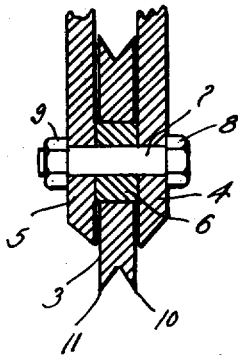
Figure 2:
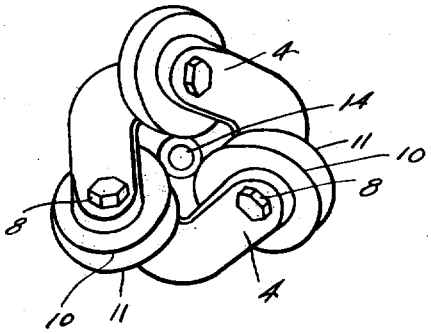

The invention is illustrated in the annexed drawings in which Figure 1 is a side elevation of the bit; Figure 2 is a bottom plan view thereof; Figure 3 is a cross section through one of the cutters showing its manner of mounting, being a view taken on line 3—3 on Figure 1.

Corresponding reference characters designate corresponding parts in all of the figures.

The bit comprises, generally, a stem 1, a plurality of pairs of spaced arms projecting from the lower end portion of the stem, and disk cutters 3 rotatably mounted between the arms. Each pair of arms includes an upper arm 5 and a lower arm 4. The arms 4 and 5 of each pair are spaced apart to accommodate a cutter and project beyond the end of the stem and also radially from the stem to support the cutter beyond the end of the stem and to extend or project outwardly from a point close to the central longitudinal axis of the stem. In accordance with our invention the arms 4 and 5, in addition to projecting from the stem in the manner above described, have their outer or cutter carrying portions tilted or diagonally disposed to support the cutter in a pitched or tilted position, as shown in the drawings. In the preferred application of the invention the arms are such as to carry the cutter at an angle of approximately 45 degrees with reference to the bottom of the hole being drilled. In the arrangement shown the cutter 3 is mounted between the arms 4 and 5 by means of a bolt 7 and a bushing 6. We have shown the head 8 of the bolt engaging the lower arm 4 and a nut 9 applied to the threaded end of the bolt to engage the arm 5. The bushing may be made sufficiently long so that it can be clamped tight between the arms by tightening nut 9 on the bolt and still allow the cutter to turn freely.

In the preferred arrangement there are three pairs of arms and, therefore, three cutters 3, equally spaced or symmetrically arranged around the central longitudinal axis of the stem, as clearly shown in Figure 2 of the drawings. This symmetrical arrangement of the parts causes the bit to be balanced and causes it to remain central in the hole.

In accordance with our invention each cutter 3 has a comparatively thick or wide periphery provided with a central V-shaped groove, leaving or forming two sharp cutting edges 10 and 11. In accordance with our present invention the pitch or angularity of the cutter carrying arms is such that the lower or trailing edge 10 of each cutter disc engages and acts upon the bottom of the hole being drilled, clearing the side wall of the hole, while the forward or leading edge 11 clears the bottom of the hole and cuts the side wall of the hole having more or less of a reaming action. The pitch or inclination of the cutter is such that its rear side extends upwardly and rearwardly at an oblique angle of about forty-five degrees and the groove is formed in the periphery of the cutter so that the wall joining the lower edge 10 extends upwardly from the lowermost part of the cutter. This relationing of parts at the bottom cutting edge has been found to be very effective. Through the general cutter arrangement and action above described the work or cutting is divided between the two edges 10 and 11, thus making the bit particularly efficient and making the cutters long lived.

The stem 1 is provided at its upper end with the usual threaded pin 13 for engagement with the box on the lower end of a drill stem. Further, the stem has a central or axial bore 14 opening downward at the center of the lower end of the stem. This bore 14 is for circulating fluid and, being centrally located, as shown in the drawings, directs a jet of circulating fluid downwardly on the innermost sides or parts of the several cutters. The cutters being pitched, as above described, at a comparatively great angle, are materially aided in rotation by the jet of circulating fluid impinging upon their inner parts and, therefore, the circulating fluid facilitates rotation of the cutters as well as keeping the parts free of mud and cuttings.

Having described our invention, we claim:

1. A drill bit including a stem, a plurality of arms projecting from the lower end portion of said stem, disk cutters journaled in said arms, each cutter being annularly grooved at its periphery to have a pair of spaced cutting edges, said arms being angularly related to the axis of said stem so that one cutting edge of each cutter will cut the bottom of the well bore and the other cutting edge will cut the side of the bore.

2. A drill bit including a stem, three or more arms formed on the lower end of said stem and spaced equidistant apart, three or more disk cutters journaled respectively in said arms, said cutters each being annularly grooved at its periphery to have a pair of spaced cutting edges, said arms being angularly related to the axis of the stem so that one cutting edge of each cutter will cut the bottom and the other cutting edge will cut the side of the well bore.

3. A drill bit including a stem, a plurality of arms formed on the lower end of said stem, disk cutters journaled in said arms, said cutters each being annularly grooved at its periphery to have a pair of spaced cutting edges, said arms being angularly related to the axis of said stem so that one cutting edge of each cutter will cut the bottom of the well bore while the other cutting edge will cut the side of the bore, said cutters being of such diameter and arranged in such manner as to cut a coreless bore.

In witness that we claim the foregoing we have hereunto subscribed our names this 12th day of September, 1927.

VAN J. KUBIN.
PERRY FUNDERBURK.